Sept. 24, 1929.  L. C. HILL  1,728,968
PROCESS AND APPARATUS FOR UNLOADING GRANULAR MATERIALS
Filed March 25, 1927  2 Sheets-Sheet 1

INVENTOR
LIONEL COKE HILL
BY Fetherstonhaugh&Co
ATTORNEYS.

Sept. 24, 1929.　　　　　L. C. HILL　　　　　1,728,968
PROCESS AND APPARATUS FOR UNLOADING GRANULAR MATERIALS
Filed March 25, 1927　　2 Sheets-Sheet 2
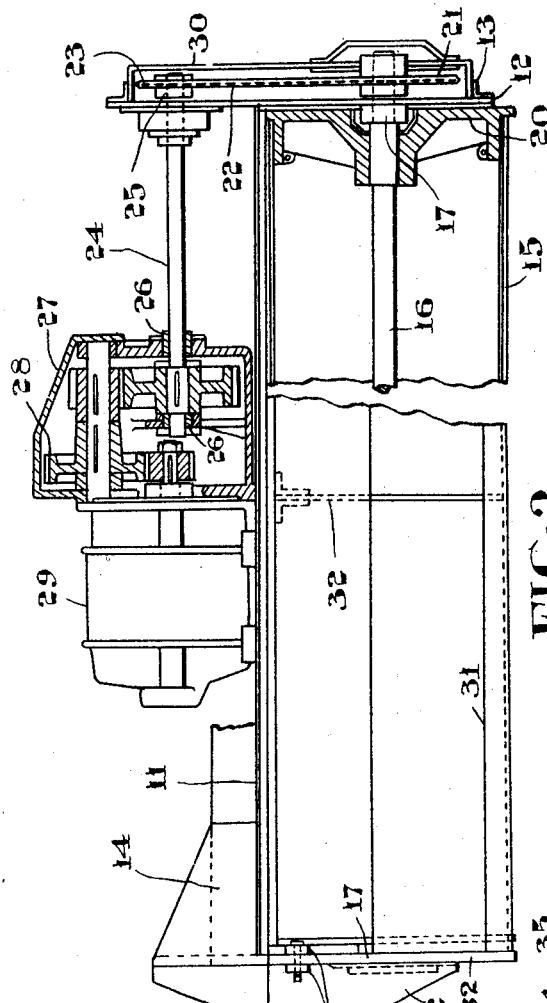
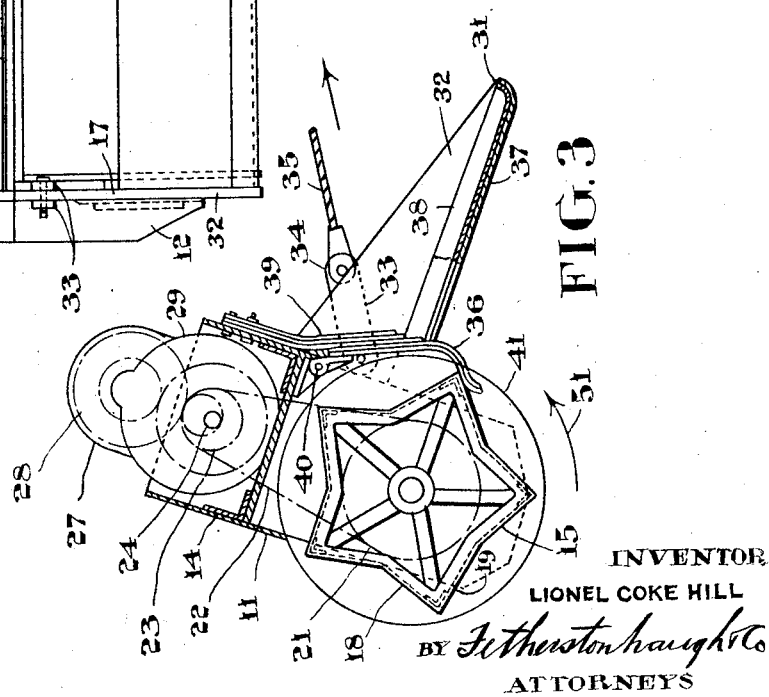
INVENTOR
LIONEL COKE HILL
BY Fetherstonhaugh & Co
ATTORNEYS Patented Sept. 24, 1929

1,728,968

UNITED STATES PATENT OFFICE

LIONEL COKE HILL, OF MONTREAL, QUEBEC, CANADA

PROCESS AND APPARATUS FOR UNLOADING GRANULAR MATERIALS

Application filed March 25, 1927. Serial No. 178,409.

This invention relates to new and useful improvements in machines for unloading granular materials from the holds of vessels and the like, and the object of the invention is to provide a simple and easily operated machine of the power shovel type which will considerably reduce the manual labour usually employed in operating devices of this class.

Another object is to provide a method of sufficiently compacting or compressing the sloping face of a pile of grain at its natural angle of repose, to allow of the passage thereover of a self-propelled machine of the power shovel type, said machine acting as the compacting agent while in operation.

Power shovels usually employed in handling ganular materials are, at the present time, operated by being pulled over the grain by man power, dug into the grain, and then hauled back towards the conveyor or starting point, by means of power drums or winches, or in the event of the shovels being too heavy to be dragged over the grain by man power, they are hauled over the grain by ropes reeved through blocks secured to the sides of the ship's hold, said ropes being operated by suitable power driven winches, or drums. In either of the above methods it is necessary for men to climb the sloping surfaces of the grain with light scoops or shovels, or with heavy rope reeving tackle which has to be fixed into position to operate the heavier scoops or shovels. The foregoing methods of unloading vessels are slow, very expensive and even hazardous, and each calls for an unnecessary amount of manual labour.

According to my invention I avoid the necessity of employing manual labour to draw back the light scoops or shovels, or in the case of the heavier types of shovels, the necessity of using special pulley and rope tackle for drawing the shovels over the sloping surfaces of the grain to bring them into their scooping or feeding position, by employing self-propelled shovel mechanism. My improved shovel mechanism consists of a propeller or roller rotatably mounted on a frame and driven through suitable gearing by a motor, or other power unit. On the rear side of the frame, a shoe plate, float, or tail, is provided to compact or compress the grain under the shoe plate and to counteract the torque of the motor. The internal friction of the compacted grain being greater than the friction between the grain and the shoe overlying it, the grain remains practically undisturbed and the shoe plate slides over it. The propeller may be made of any desired form of sufficient bearing surface to prevent it sinking too far into the grain, and suitable means is provided or formed on the periphery of the propeller to lift and propel the machine over the sloping surfaces of the grain and away from the conveyor. Means are also provided to direct the grain under the shoe plate to prevent the grain from being carried over the propeller during its operation. The mechanism is drawn towards the conveyor by ropes and power drums, or winches, similar to the types at present in use.

In the drawings which illustrate one form of my invention:—

Figure 2 is a partial side elevation of my improved shovel with parts broken away to disclose the driving mechanism and the propeller construction.

Figure 3 is a sectional end elevation of the shovel shown in Figure 2.

Figure 1:
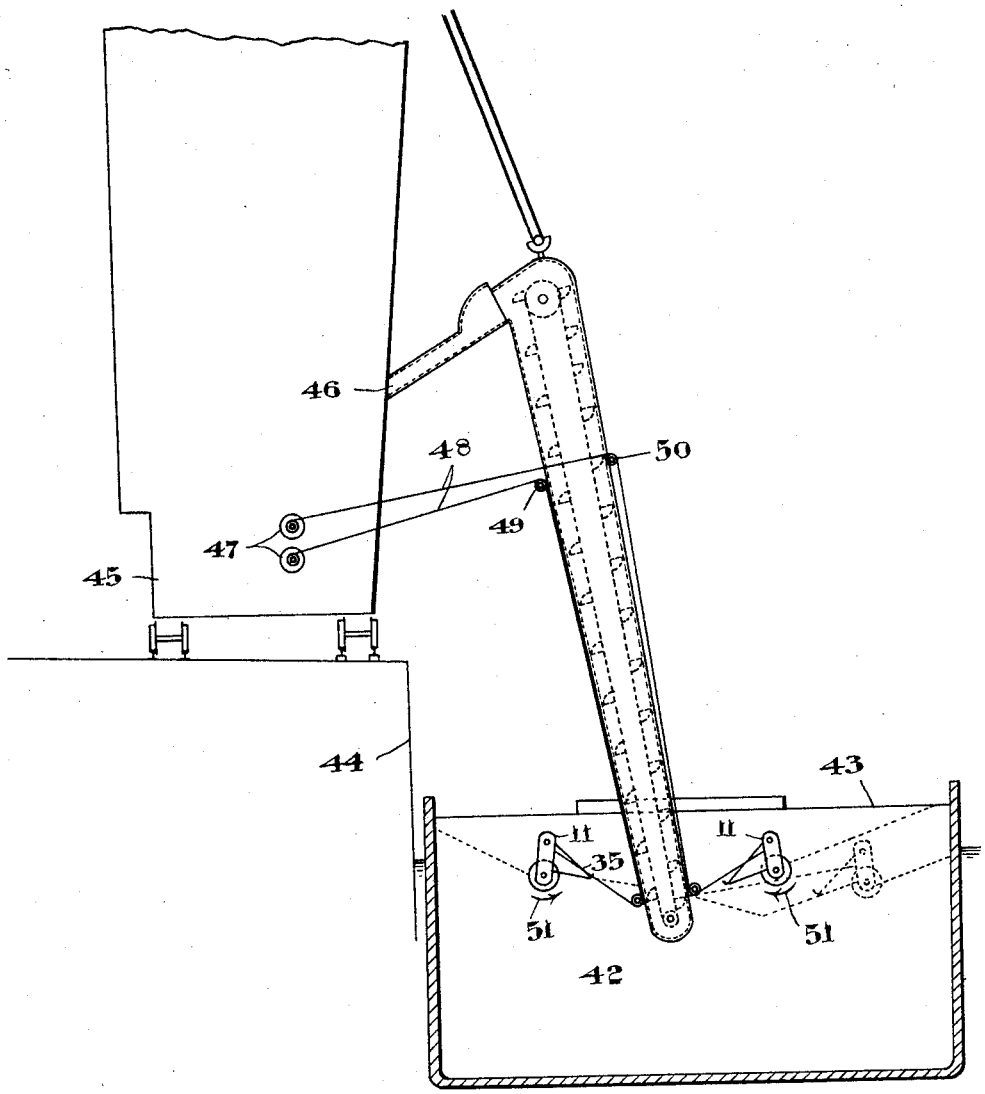
Figure 1 is a diagrammatic illustration of my improved power shovel working in conjunction with a bucket conveyor in unloading grain from a vessel.

Referring more particularly to the drawings, 11 designates the shovel frame which for illustrative purposes only is shown as built of structural shapes and plates. The frame consists of the end plates 12, suitably reinforced by the angles 13 and connected together by means of the angle and plate frame 14, which also forms a support for the driving mechanism hereinafter described. Mounted between the end plates is the roller or propeller 15, which is secured to and adapted to rotate with a shaft 16 rotatably mounted in suitable bearings 17 secured to the end plates. The propeller may be of any desired shape and large enough to prevent its sinking too far into the granular material. In Figure 3 the propeller is shown in the form of a pentagon with the sides 18 depressed between their supporting edges. The sides may be made of plates joined together by angles 19 which are secured to the roller ends, 20. Secured to one end of the shaft 16, is the sprocket or toothed wheel 21 which is driven by means of a chain 22 and toothed pinion 23 secured to a shaft 24 rotatably mounted in bearings 25 and 26, one secured to the end plate and the others formed in the gear case 27. The gear case is preferably of the totally enclosed type and mounted therein are the gear reductions designated as a whole by the numeral 28. The gears are driven by means of a power unit which, in the example shown, is a motor 29. The motor and the gear case are mounted on the frame extending between the end plates. A suitable chain and sprocket wheel covering or casing 30 may be secured to the end plate. Extending rearwardly from and secured to the end plates, is the shoe plate or float 31, which compacts or compresses the grain under it when the device is being propelled over the sloping grain surfaces. The shoe plate is constructed of plates extending from end to end of the device and suitable stiffening members 32 may be secured to the plate intermediate its ends. Secured to one or more of said stiffeners, are the links 33, to the free ends 34 of which hauling ropes 35 are attached in any suitable manner. To prevent the grain from being carried over the roller during its rotation, and to direct the grain to the underside of the shoe plate, a cam or spring controlled shutter or deflector 36 is provided. This deflector extends from end to end of the machine and is hingedly attached to the underside of the motor supporting and spacing frame. The shoe is preferably made of curved form, as shown, and may be built of plates 37 and stiffeners 38. The deflector may be held against the propeller or roller by means of the leaf springs 39 which may be secured to the spacer frame by means of the bolts 40.

In operation the device is lowered on to the surface of the grain which, in the diagrammatic illustration shown in Figure 1, is being unloaded from the hold 42 of the vessel 43, which is anchored to the wharf 44. Mounted on the wharf is the marine tower or receiving house 45, which is provided with a marine leg or vertical bucket conveyor for lifting the grain in the vertical direction towards the chute 46. The bucket conveyor is for illustrative purposes only and any of the well-known types of conveyors may be used. Power driven rope drums 47 are located in the receiving house and suitable ropes 48, from said drums, are passed over guide pulleys 49 and 50 and connected to the links secured to the shovel. The motor is then put into operation and rotates the propeller, in the direction indicated by arrows 51, to cause the device to move in a direction away from the openings at the base of the bucket conveyor. The loose grain immediately in front of the revolving propeller is transferred to the rear thereof and is also directed to the underside of the shoe plate, where it is compacted or compressed by the same, and results in a compacted mass of material under and behind the shoe for the propeller to push against, with the result that the whole machine advances rapidly over the surface of loose grain or up a slope of grain in front of it. It will be readily understood that the internal friction of the grain is greater than the friction between the grain and the underside of the shoe plate overlying it, so that the grain will be left in a practically undisturbed state as the shoe plate passes or slides thereover. The ropes from the winches are slackened out as the machine moves away from the conveyor. When it has travelled the desired distance, the machine is then drawn backwards towards the bucket conveyor by the winches or rope drums. As the machine approaches the conveyor, the propeller and the shoe plate act as a scoop or shovel to force the grain towards the bucket conveyor or marine leg which lifts the grain from the vessel. The operation is repeated until the vessel is emptied. The motor may be electrically connected to suitable controlling mechanism in the usual manner, that is, by flexible cables (not shown).

The device is shown operating in the hold of a ship, but it is applicable to the unloading of any granular material from cars, bins, or the like storage or transporting devices. The device may also be applied to the propulsion of any vehicles over granular material of such a nature that the wheels fail to grip it as, for example, an automobile being driven over loose and deep sand. The machine may be guided in any direction by manipulating the ropes 35 connecting the devices to the winches.

It will be seen that practically no manual labour is required to draw or drag the shovel over the grain, nor are any hauling ropes and pulley tackle required secured to the vessel to manipulate the machine, as the device is self-propelled and greatly reduces the time taken and cost of unloading vessels when compared with the devices at present in use for this purpose.

Having thus described my invention, what I claim is:—

1. In an unloading device, a power scoop for handling granular material comprising a frame, a propeller having an irregular outer bearing surface adapted to rest upon granular material, said propeller being rotatably mounted in the frame, a power unit mounted on the frame and adapted to rotate the propeller to move same over said granular material, and a shoe plate secured to the machine and adapted to compact the material as it passes thereover.

2. In an unloading device, a power scoop for handling granular material comprising a frame, a propeller having an irregular bearing surface, said propeller being rotatably mounted in the frame, a power unit mounted on the frame and adapted to rotate the propeller to cause same to propel itself over a sloping granular surface, and a shoe plate extending outwardly from the frame and away from the direction of travel of the device to stabilize the machine and compact the grain as it passes thereover.

3. In an unloading device, a power scoop for handling granular material comprising, a frame, a propeller rotatably mounted in the frame and adapted to rest upon the granular material, means formed in the face of the propeller to propel the shovel over the granular matter when the propeller is rotated, a motor secured to the frame and adapted to rotate the propeller through suitable gearing, a shoe plate secured to the rear of the frame and adapted to rest on the material to compact same, and a deflector secured to the frame and contacting with the surface of the roller to prevent the material from being carried thereover during rotation of the propeller, and to direct the material displaced by the propeller towards the underside of the shoe plate.

4. In an unloading device, a power scoop for handling granular material comprising, a frame, a propeller having an irregular bearing surface resting on the granular material, a motor secured to the frame and adapted to rotate the propeller through suitable gearing, a shoe plate extending outwardly from the frame and resting on the granular material to resist the torque of the motor during its operation, a deflector contacting with the propeller surface and pivotally secured to the frame to prevent the material from being carried over by the propeller during its rotation, and means for holding the deflector in contact with the surface of the propeller.

In witness whereof, I have hereunto set my hand.

LIONEL COKE HILL.